(12) United States Patent
Sahara

(10) Patent No.: US 10,315,430 B2
(45) Date of Patent: Jun. 11, 2019

(54) PRINTING APPARATUS PERFORMING POLLING TO DETECT MOUNTING AND UNMOUNTING OF CARTRIDGES, AND CONTROL METHOD OF PRINTING AND STORAGE MEDIUM

(71) Applicant: CANON KABUSHIKI KAISHA, Tokyo (JP)

(72) Inventor: Akiyoshi Sahara, Funabashi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/050,286

(22) Filed: Jul. 31, 2018

(65) Prior Publication Data

US 2019/0047291 A1    Feb. 14, 2019

(30) Foreign Application Priority Data

Aug. 10, 2017 (JP) .................................. 2017-155626

(51) Int. Cl.
*G06F 3/12* (2006.01)
*B41J 2/175* (2006.01)
(Continued)

(52) U.S. Cl.
CPC ....... *B41J 2/17546* (2013.01); *B41J 2/17513* (2013.01); *B41J 2/17523* (2013.01); *B41J 2/2103* (2013.01); *B41J 2/2107* (2013.01); *G06K 15/005* (2013.01); *G06K 15/102* (2013.01); *H04N 1/00408* (2013.01); *H04N 1/00477* (2013.01)

(58) Field of Classification Search
CPC .......................... B41J 2/17546; B41J 2/17513; B41J 2/17523; B41J 2/2103; B41J 2/2107; G06K 15/005; G06K 15/102; H04N 1/00408; H04N 1/00477
USPC .................................................. 358/1.1–1.18
See application file for complete search history.

(56) References Cited

U.S. PATENT DOCUMENTS 9,440,447 B1 * 9/2016 Maeshima ........... B41J 2/17523
2006/0284919 A1 * 12/2006 Kuribayashi ........ B41J 2/17546
347/19

(Continued)

FOREIGN PATENT DOCUMENTS

JP    2016-221761 A    12/2016

*Primary Examiner* — Gabriel I Garcia
(74) *Attorney, Agent, or Firm* — Venable LLP

(57) ABSTRACT

The printing apparatus according to the present invention includes a reading unit configured to read, in a case of detecting a mounting position at which a mounting state of a printing material cartridge has changed from non-mounting to mounting, by performing polling for a plurality of printing material cartridges, color information from the printing material cartridge mounted at the detected mounting position, and a notification unit configured to notify, in a case where the printing material color indicated by the color information is different from the printing material color corresponding to the detected mounting position, a user that the printing material cartridge is mounted incorrectly. The reading unit omits processing to read color information from the printing material cartridge mounted at the detected mounting position in a case where the mounting state of the printing material cartridge mounted at the detected mounting position is maintained as mounting.

17 Claims, 11 Drawing Sheets

(51) Int. Cl.
  *H04N 1/00*  (2006.01)
  *B41J 2/21*  (2006.01)
  *G06K 15/00*  (2006.01)
  *G06K 15/10*  (2006.01)

(56) References Cited

U.S. PATENT DOCUMENTS

| | | | |
|---|---|---|---|
| 2009/0324260 A1* | 12/2009 | Andou | G03G 15/50 399/13 |
| 2012/0026546 A1* | 2/2012 | Miura | B41J 2/175 358/1.15 |
| 2013/0027448 A1* | 1/2013 | Misumi | B41J 2/17546 347/6 |
| 2016/0350637 A1 | 12/2016 | Kawana | |

* cited by examiner

| ADDRESS | INFORMATION |
|---|---|
| 0x00 | SERIAL NUMBER |
| 0x04 | DATE OF MANUFACTURE |
| 0x08 | INK COLOR |
| 0x0C | INK TANK CAPACITY |
| . . . | . . . |
| 0x7C | CHECKSUM |
| . . . | . . . |
| 0xFC | I2C SLAVE ADDRESS |

FIG.7

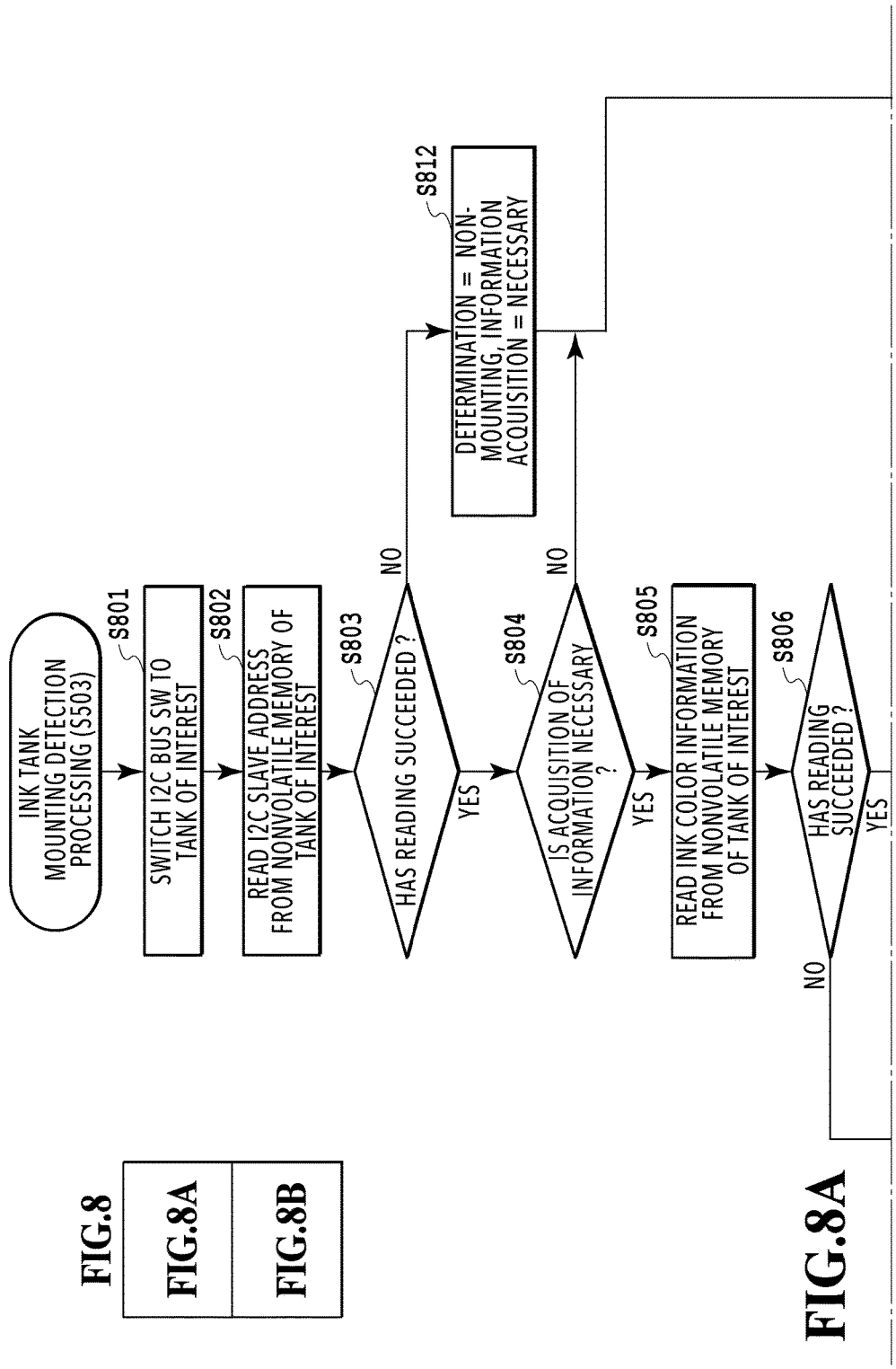

| INK COLOR | I2C BUS SW NUMBER | MEMORY COLOR INFORMATION |
|---|---|---|
| CYAN (C) | 1 | 0x11111111 |
| MAGENTA (M) | 2 | 0x22222222 |
| YELLOW (Y) | 3 | 0x33333333 |
| BLACK (K) | 4 | 0x44444444 |

FIG.9

PRINTING APPARATUS PERFORMING POLLING TO DETECT MOUNTING AND UNMOUNTING OF CARTRIDGES, AND CONTROL METHOD OF PRINTING AND STORAGE MEDIUM

BACKGROUND OF THE INVENTION

Field of the Invention

The present invention relates to a printing apparatus that performs printing on a printing medium by mounting a plurality of printing material cartridges whose printing material colors are different.

Description of the Related Art

Japanese Patent Laid-Open No. 2016-221761 has described a printing apparatus that detects whether or not a plurality of printing material cartridges (hereinafter, also called simply cartridges) is mounted by whether or not access to a nonvolatile memory attached to the cartridge is possible and displays the results on a screen. In the printing apparatus described in Japanese Patent Laid-Open No. 2016-221761, it is possible for a user to immediately know whether or not a cartridge can be mounted securely at the time of exchanging cartridges.

It is possible to determine whether or not a cartridge is mounted or the printing material color by performing polling in order for the nonvolatile memory of each cartridge mounted in the printing apparatus. However, with this method, there is a possibility that it is not possible to immediately notify a user of the determination results. For example, in the case where immediately after polling for one cartridge is performed, the one cartridge is mounted and unmounted, it is not possible to detect mounting and unmounting of the one cartridge until the polling for the other cartridges is completed. Because of this, there is a possibility that it is not possible to cause a user to immediately recognize that no cartridge is mounted or a cartridge is mounted incorrectly.

The present invention has been made in view of the above-described problem and an object thereof is to provide a printing apparatus capable of causing a user to immediately recognize that no cartridge is mounted or a cartridge is mounted incorrectly.

SUMMARY OF THE INVENTION

The printing apparatus according to the present invention is a printing apparatus that performs printing on a printing medium by mounting a plurality of printing material cartridges whose printing material colors are different at each mounting position determined in advance for each printing material color, the printing apparatus including a reading unit configured to read, in a case of detecting a mounting position at which a mounting state of the printing material cartridge has changed from non-mounting to mounting by performing polling to determine the mounting state of the printing material cartridge at each of the mounting positions, color information indicating a printing material color from the printing material cartridge mounted at the detected mounting position, and a notification unit configured to notify, in a case where the printing material color indicated by the color information is different from the printing material color corresponding to the detected mounting position, a user that the printing material cartridge is mounted incorrectly at the detected mounting position, and the reading unit omits processing to read color information indicating a printing material color from the printing material cartridge mounted at the detected mounting position in a case where the mounting state of the printing material cartridge mounted at the detected mounting position is maintained as mounting.

Further features of the present invention will become apparent from the following description of exemplary embodiments with reference to the attached drawings.

BRIEF DESCRIPTION OF THE DRAWINGS

FIG. 7 is a diagram showing an example of information that is stored in a nonvolatile memory mounted on an ink tank;

FIG. 8 is a diagram showing the relationship of FIG. 8A and FIG. 8B;

FIG. 8A and FIG. 8B are flowcharts showing ink tank mounting detection processing at step S503;

FIG. 9 is a diagram showing an example of control information used for the ink tank mounting detection processing shown in FIG. 8A and FIG. 8B.

DESCRIPTION OF THE EMBODIMENTS

In the following, embodiments of the present invention are explained with reference to the drawings. Configurations shown in the following embodiments are merely exemplary and the present invention is not limited to the configurations shown schematically.

First Embodiment

Figure 1:
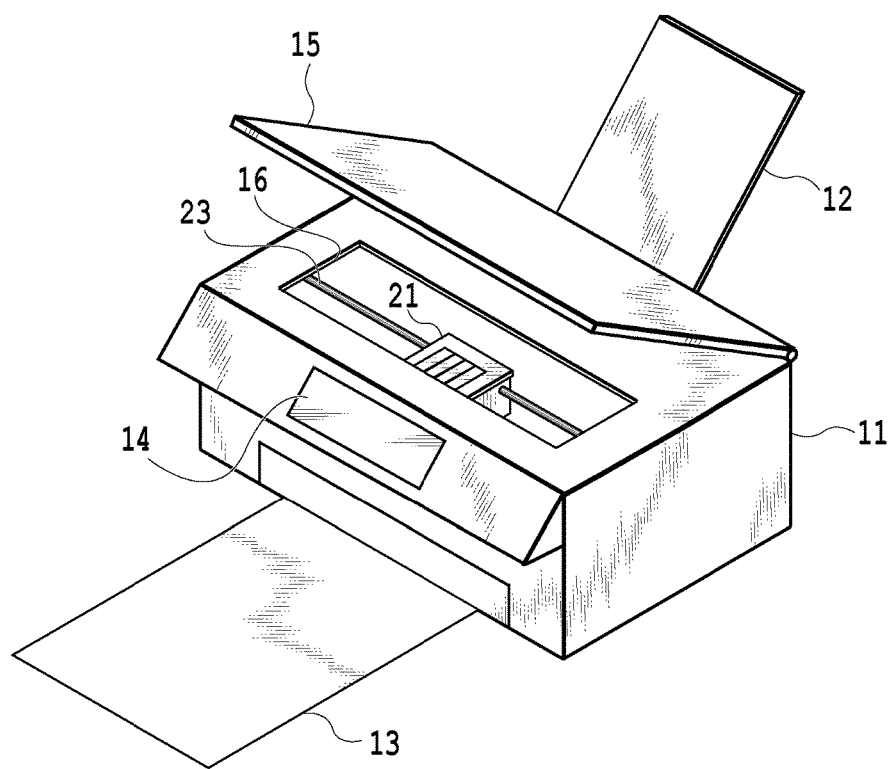
FIG. 1 is a perspective diagram showing an external appearance of a printing apparatus in a first embodiment.

FIG. 1 is a perspective diagram showing an external appearance of a printing apparatus in a first embodiment. A printing apparatus 11 feeds printing media (sheets and the like) loaded on a sheet feed tray 12 one by one and performs an ink jet printing operation. After performing the printing operation, the printing apparatus 11 discharges the printing media onto a sheet discharge tray 13. On a display panel 14, information indicating the state of the printing apparatus 11, such as a state where a sheet cannot be fed, is displayed. It is possible for a user to exchange a printing material cartridge (ink tank) mounted on a carriage 21 inside the casing of the printing apparatus 11 from an opening 16 by opening an exchange cover 15. In the case where the exchange cover 15 is opened by a user, the carriage 21 moves to the position of the opening 16 along a guide 23.

Figure 2:
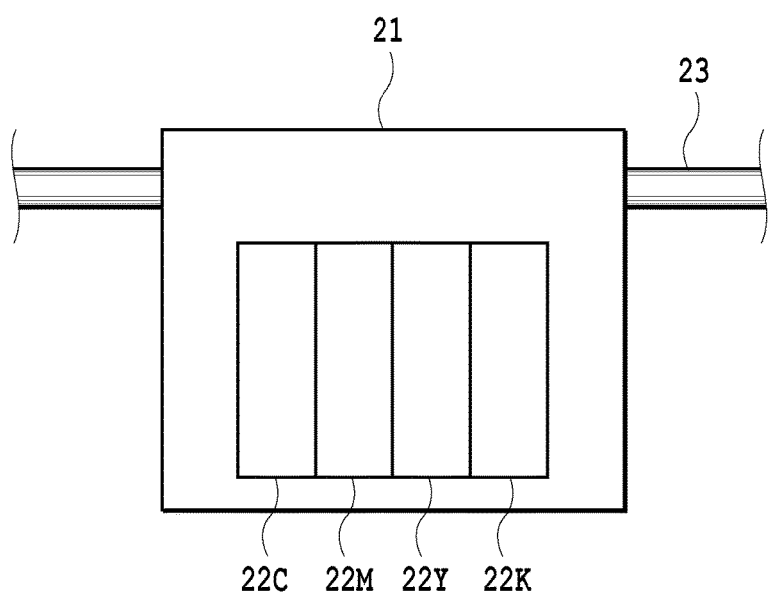
FIG. 2 is a configuration diagram of a carriage mounting ink tanks.

FIG. 2 is a configuration diagram of the carriage 21 mounting ink tanks. In FIG. 2, a diagram in the case where the carriage 21 is viewed from above is shown. The carriage 21 mounts ink tanks 22 (cyan ink tank 22C, magenta ink tank 22M, yellow ink tank 22Y, and black ink tank 22K). The ink tanks 22 in four colors can be mounted and unmounted. Further, the carriage 21 is capable of moving in the main scanning direction (horizontal direction shown in FIG. 2) along the guide 23.

In the example shown in FIG. 2, the cyan ink tank 22C, the magenta ink tank 22M, the yellow ink tank 22Y, and the black ink tank 22K are mounted in the carriage 21 in the order from the left. By the ink tanks 22 in four colors being mounted in this arrangement order, it is possible for the printing apparatus 11 in the present embodiment to correctly perform the printing operation. It is assumed that the ink tanks 22 in four colors are formed into the same shape in order to reduce the manufacturing cost. Because of this, there is a case where the ink tanks 22 in four colors are mounted in an arrangement order different from the arrangement order shown in FIG. 2, or a plurality of ink tanks 22 in the same color is mounted. In such a case, it is no longer possible to correctly perform the printing operation. Consequently, in the present embodiment, as explained in the following, by notifying a user of the mounting state of the ink tanks, a user is prompted to mount the ink tanks 22 in four colors in the correct arrangement order.

Figure 3:
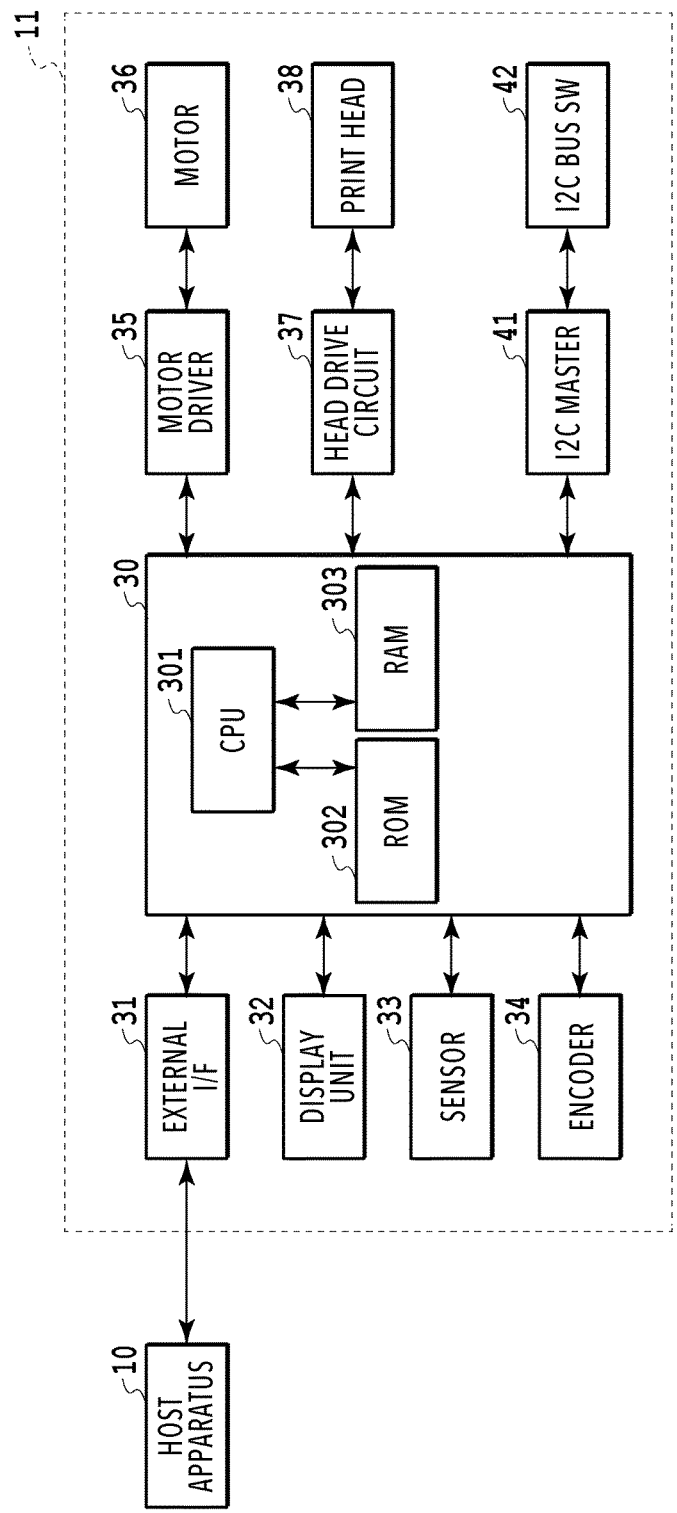
FIG. 3 is a block diagram showing an example of a system configuration of a printing apparatus.

FIG. 3 is a block diagram showing an example of a system configuration of the printing apparatus 11. The printing apparatus 11 has a control unit 30, an external interface (external I/F) 31, a display unit 32 having the display panel 14, a sensor 33, an encoder 34, a motor driver 35, a motor 36, a head drive circuit 37, and a print head 38. Further, the printing apparatus 11 has an I2C master 41 and an I2C bus switch (I2C bus SW) 42.

The control unit 30 has a ROM 302 in which control programs are stored, a CPU 301 in charge of control of the control unit 30 in accordance with the control programs, and a RAM 303 for temporarily storing data in the control. As shown in FIG. 3, each of the external I/F 31, the display unit 32, the sensor 33, the encoder 34, the motor driver 35, the head drive circuit 37, and the I2C master 41 is connected with the control unit 30. The control unit 30 is connected with a host apparatus 10 via the external I/F 31 and receives image data for performing printing on a printing medium, such as a sheet, from the host apparatus 10. Further, the control unit 30 receives various signals (sensor signals) from the sensor 33. Further, the control unit 30 receives a signal for detecting the position of the carriage 21, and the like from the encoder 34. Further, the control unit 30 drives the motor 36 for moving the carriage 21 by sending out instructions to the motor driver 35. Further, the control unit 30 causes the print head 38 to eject ink by sending out instructions to the head drive circuit 37. Further, the control unit 30 performs I2C communication with one of a plurality of I2C slaves connected to the I2C bus SW 42 by switching the I2C bus SW 42 via the I2C master 41, as will be described later. In FIG. 3, the one sensor 33 and the one encoder 34 are illustrated, but to the control unit 30, another sensor or encoder may be connected. Further, in FIG. 3, the one motor 36 is illustrated, but to the motor driver 35, another motor may be connected.

Figure 4:
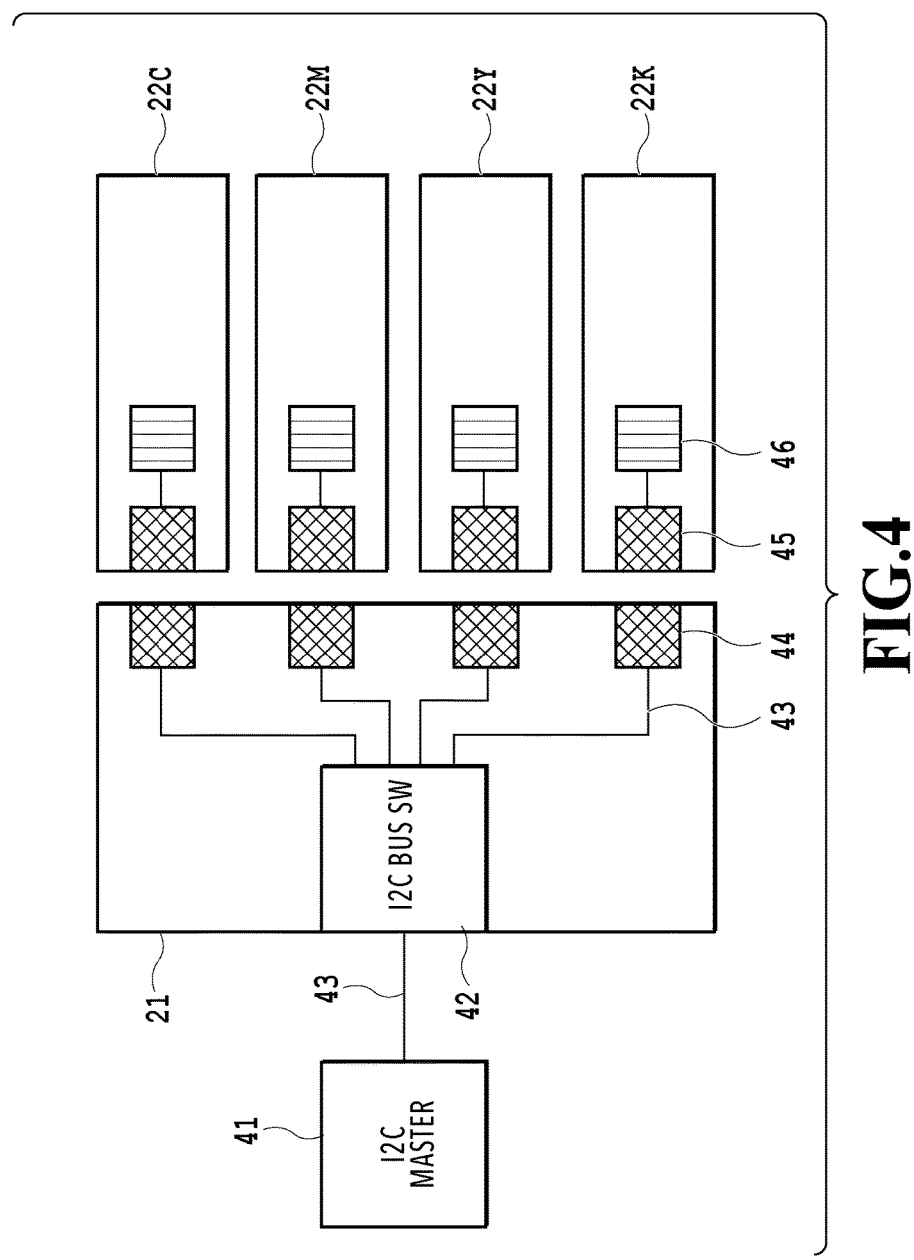
FIG. 4 is a diagram showing the way an I2C master and ink tanks in four colors are connected via an I2C bus SW.

FIG. 4 is a diagram showing the way the I2C master 41 and the ink tanks 22 in four colors are connected via the I2C bus SW 42. As shown in FIG. 4, each of the ink tanks 22C to 22K in four colors has a nonvolatile memory 46 and a connection terminal 45. The carriage 21 has four connection reception ports 44. The four connection reception ports 44 are arranged so as to face the ink tanks 22 in four colors. In the case where the ink tank 22 is mounted in the carriage 21, the connection reception port 44 and the connection terminal 45 are brought into conduction. In the case where the connection reception port 44 and the connection terminal 45 are brought into conduction, the control unit 30 of the printing apparatus 11 enters the state where access by I2C communication to the nonvolatile memory 46, which is the I2C slave, is possible via the I2C master 41 and the I2C bus SW 42. As described above, in the present embodiment, by providing the I2C bus SW 42 between the I2C master 41 and the four connection reception ports 44, it is made possible to determine the mounting position of the ink tank 22, that is, at which of the four connection reception ports 44 the ink tank 22 is mounted. In the case where the control unit 30 accesses the nonvolatile memory 46 of the specific ink tank 22 via the I2C master 41, first, the control unit 30 communicates with the I2C bus SW 42 that operates as the I2C slave like the nonvolatile memory 46. Then, the control unit 30 switches the I2C bus SW 42 so that the I2C master 41 is brought into conduction only with the specific connection reception port 44 via an I2C cable 43. Due to this, it is made possible for the I2C master 41 to communicate with the nonvolatile memory 46 of the specific ink tank 22 via the specific connection reception port 44.

Figure 5:
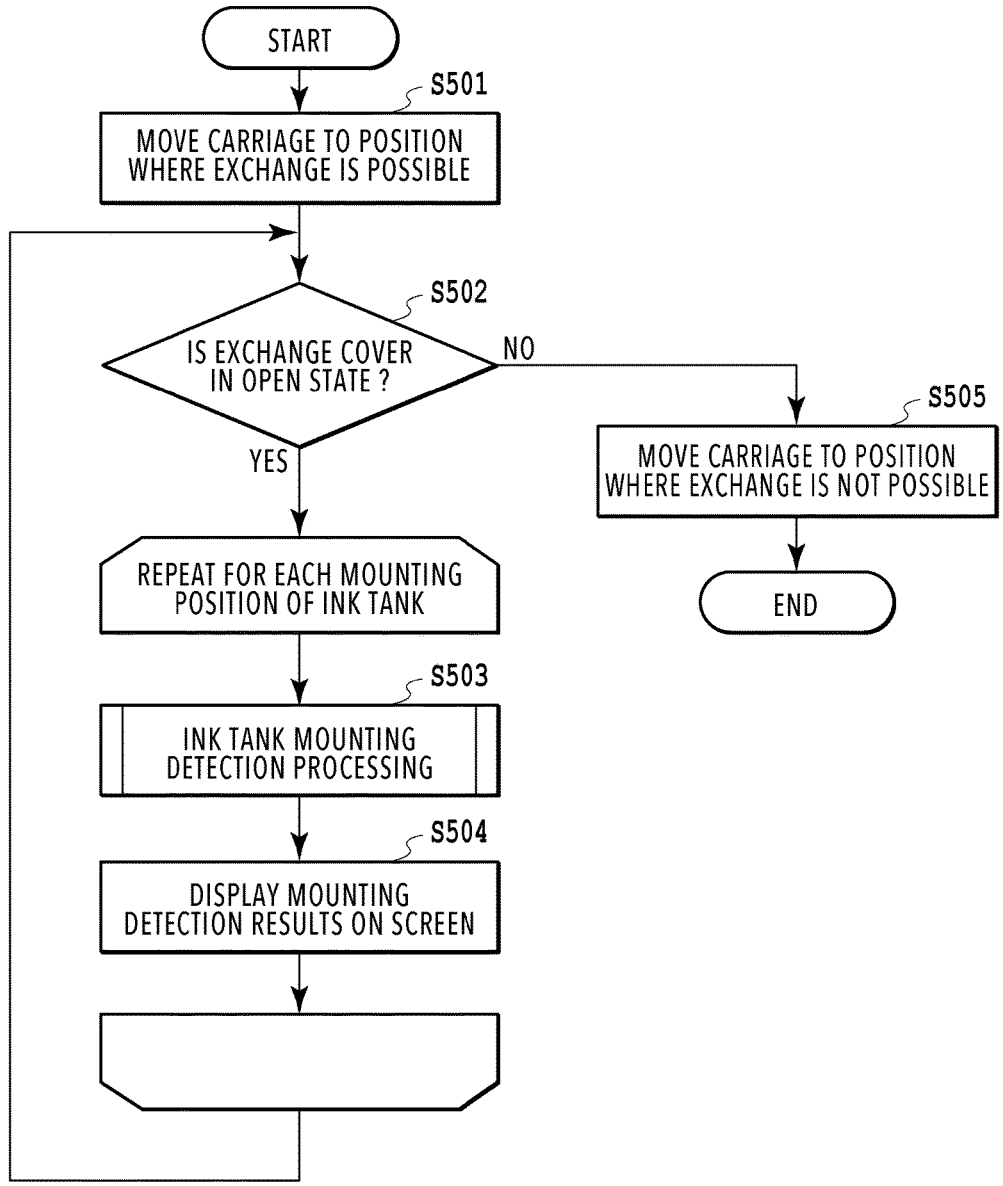
FIG. 5 is a flowchart showing processing of a printing apparatus at the time of ink tank exchange.

FIG. 5 is a flowchart showing processing of the printing apparatus 11 at the time of ink tank exchange. The processing shown by the flowchart shown in FIG. 5 is implemented by the CPU 301 reading a program relating to the flowchart from the memory and executing the program.

In the case where a user opens the exchange cover 15, first, the control unit 30 of the printing apparatus 11 moves the carriage 21 to the position of the opening 16 so that the ink tank 22 can be exchanged (step S501).

Next, the control unit 30 checks the open/closed state of the exchange cover 15 (step S502). In the case where the exchange cover 15 is closed (NO at step S502), the control unit 30 determines that a user does not perform exchange of the ink tank 22 or that a user has completed exchange of the ink tank 22 and the processing advances to step S505. On the other hand, in the case where the exchange cover 15 is open (YES at step S502), the control unit 30 performs the processing at steps S503 and S504 repeatedly for each mounting position of the ink tanks 22 (each of the four connection reception ports 44).

At step S503, the control unit 30 performs processing (hereinafter, called ink tank mounting detection processing) to detect whether the ink tank 22 is mounted correctly at the corresponding connection reception port 44 by I2C communication. Details of the ink tank mounting detection processing will be described later. At step S504, based on the results of the ink tank mounting detection processing at step S503, a screen showing the mounting state of the ink tanks 22 is displayed on the display panel 14. The screen displayed on the display panel 14 at this time will be described later. In the case of completing the processing at steps S503 and S504 for each mounting position of the ink tanks, the control unit 30 returns to the processing at step S502.

At step S505, the control unit 30 moves the carriage 21 to a position (position apart from the opening 16) at which the ink tanks 22 cannot be exchanged and terminates the processing.

Figure 6A:
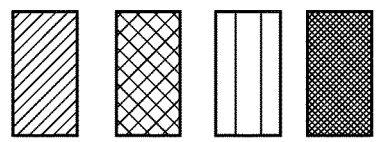
FIG. 6A and FIG. 6B are diagrams each showing an example of a screen showing a mounting state of ink tanks, which is displayed on a display panel.
Figure 6B:
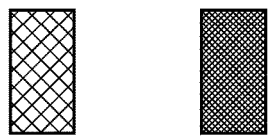

FIG. 6A and FIG. 6B are diagrams each showing an example of a screen showing the mounting state of the ink tanks 22, which is displayed on the display panel 14. In the present embodiment, in the case of determining that the ink tank 22 is mounted at the correct position of the carriage 21 in accordance with the results of performing the ink tank mounting detection processing, the control unit 30 displays a rectangle corresponding to the ink color of the ink tank 22 on the display panel 14. On the other hand, in the case of determining that the ink tank 22 is not mounted in the carriage 21, the control unit 30 does not display a rectangle corresponding to the ink color of the ink tank 22. Further, also in the case where the ink tank 22 in another ink color is mounted at the ink tank mounting position of a certain ink color, the control unit 30 does not similarly display a rectangle corresponding to the ink color of the ink tank 22. The screen shown in FIG. 6A shows that the ink tanks 22 in four colors of cyan (C), magenta (M), yellow (Y), and black (K) are mounted at the correct positions. On the other hand, the screen shown in FIG. 6B shows that the cyan (C) and yellow (Y) ink tanks 22 are not mounted, or that the ink tanks 22 in other colors are mounted at the positions of cyan (C) and yellow (Y). By displaying the screen as shown in FIG. 6B on the display panel 14, it is possible for a user to notice an error in the ink tank exchange operation in the state where the exchange cover is left open (in the state before the exchange cover is closed), and therefore, it is made possible to correctly mount the ink tank again.

FIG. 7 is a diagram showing an example of information that is stored in the nonvolatile memory 46 mounted on the ink tank 22. In FIG. 7, the left column shows addresses within the nonvolatile memory and the right column shows information (information at the time of manufacture) that is written at each address at the time of manufacture of the ink tank 22. Each piece of information at the time of manufacture is 4-byte data. In the example shown in FIG. 7, at address 0x00 (0x indicates hexadecimal number) of the nonvolatile memory 46, a serial number for individual identification of the individual ink tanks 22 is written. At address 0x04, the date of manufacture of the ink tank 22 is written. At address 0x08, information (ink color information) capable of identifying the ink color included in the ink tank 22 is written. At address 0x0C, the amount of ink that is injected into the ink tank 22 (capacity of ink tank) at the time of manufacture is written. Although not shown schematically, at address 0x10 and subsequent addresses of the nonvolatile memory 46 also, information at the time of manufacture of the ink tank 22 may be written. At address 0x7C, a checksum is written as an error detecting code for detecting an error (data corruption) of data at addresses from 0x00 to 0x78. In the present embodiment, the control unit 30 adds data in units of four bytes in order at addresses from 0x00 to 0x78 and writes the low four bytes of the addition results as a checksum. At the time of reading information from the nonvolatile memory 46, the control unit 30 reads data in units of four bytes in order at addresses from 0x00 to 0x78 and checks whether the checksum of the read data coincides with the value written at address 0x7C. In the case where the checksum of the read data coincides with the value written at address 0x7C, it is possible to determine that no error will be detected in the data at addresses from 0x00 to 0x78, that is, reliability of the information is high. At address 0xFC, an I2C slave address at the time of the nonvolatile memory 46 operating as the I2C slave is written. The I2C slave address is an identifier for the I2C master to communicate with the specific I2C slave (for example, the nonvolatile memory 46), and is also an identifier for distinguishing the specific I2C slave from another I2C slave (for example, I2C bus SW 42).

Figure 8B:
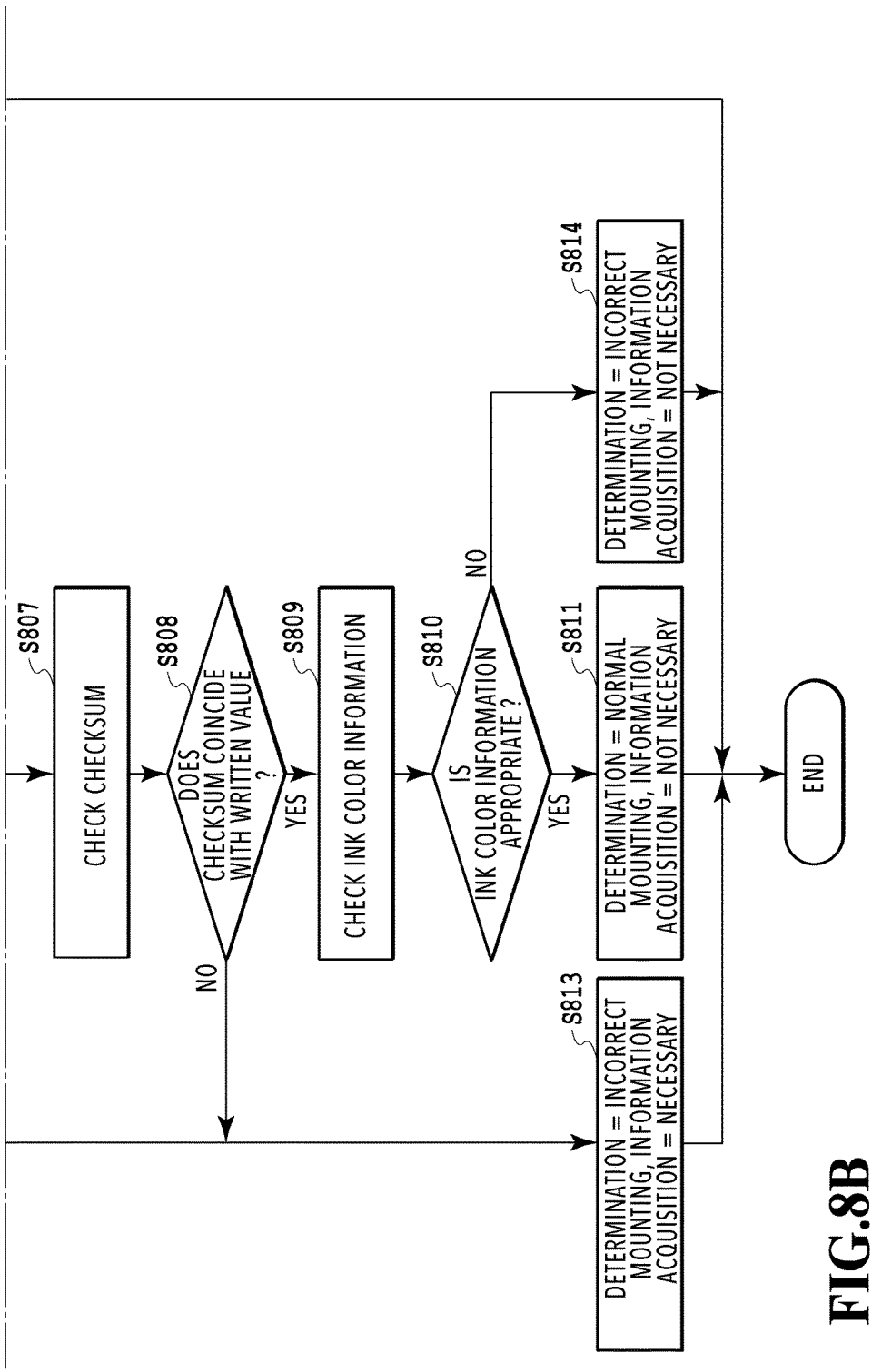

FIG. 8A and FIG. 8B are flowcharts showing the ink tank mounting detection processing at step S503. The processing shown in FIG. 8A and FIG. 8B is performed for the ink tank 22 at a mounting position of interest by taking the position corresponding to one of the four connection reception ports 44 in FIG. 4 as the mounting position of interest. Further, as explained in FIG. 5, the processing shown in FIG. 8A and FIG. 8B is performed for the ink tanks 22 connected to the four connection reception ports 44 respectively while switching the mounting positions of interest.

First, the control unit 30 switches the I2C bus SW 42 so that the nonvolatile memory 46 mounted on the ink tank 22 at the mounting position of interest (hereinafter, called tank of interest) and the I2C master 41 can perform I2C communication (step S801). For example, in the case where the cyan ink tank 22C is taken to be the tank of interest, the I2C bus SW 42 is switched so that the connection reception port 44 located uppermost in FIG. 4 is brought into conduction with the I2C master 41.

Next, the control unit 30 performs polling to determine whether or not the tank of interest is mounted. More specifically, under the control of the control unit 30, the I2C master 41 communicates with the nonvolatile memory 46 mounted on the tank of interest by I2C communication and reads information (I2C slave address) written at address 0xFC of the nonvolatile memory 46 (step S802). In the case where reading of the I2C slave address has failed (NO at step S803), the control unit 30 determines that the ink tank 22 is not mounted at the mounting position of interest (step S812). That reason is that the failure in I2C communication is considered that the connection reception port 44 and the connection terminal 45 are not brought into conduction, that is, the tank of interest is not mounted in the carriage 21. Then, the control unit 30 sets "ink tank not mounted" as the results of the ink tank mounting detection processing. Further, the control unit 30 sets a flag (hereinafter, called information acquisition necessity flag) used for the determination at step S804, to be described later, to "necessary (ON)". The control unit 30 holds the information acquisition necessity flag for each mounting position. Further, at step S803, what is required is being capable of determining whether or not I2C communication is established, and therefore, the information that is read at step S802 is not limited to the information written at address 0xFC and the contents thereof are not limited to the I2C slave address. After step S812, the control unit 30 terminates this processing. It is assumed that one of the two states, that is, "necessary (ON)" and "not necessary (OFF)" is set to the information acquisition necessity flag and as the initial value, "necessary (ON)" is set in advance.

In the case where reading of the I2C slave address has succeeded (YES at step S803), the control unit 30 checks the information acquisition necessity flag (step S804). In the case where the information acquisition necessity flag is set to "not necessary (OFF) (NO at step S804), the control unit 30 terminates this processing. In the case where the information acquisition necessity flag is set to "necessary (ON)" (YES at step S804), the control unit 30 communicates with the nonvolatile memory 46 of the tank of interest by controlling the I2C master 41 and the I2C bus SW 42. Then, the control unit 30 reads information written at addresses from 0x00 to 0x7F of the nonvolatile memory 46 of the tank of interest onto the RAM 303 (step S805). In the case where reading of information has failed at step S805 (NO at step S806), the processing advances to step S813. On the other hand, in the case where reading of information has succeeded at step S805 (YES at step S806), the control unit 30 compares the checksum of the value read at step S805 with the value written at address 0x7C of the nonvolatile memory 46 of the tank of interest (step S807).

In the case where the checksum does not coincide with the written value (NO at step S808), the processing advances to step S813. At step S813, the control unit 30 sets the information acquisition necessity flag to "necessary (ON)" because there is a possibility of communication abnormality. Due to this, in the ink tank mounting detection processing of the next time for the current tank of interest, reading of information written at addresses from 0x00 to 0x7F of the nonvolatile memory 46 of the tank of interest (processing at step S805) is performed again. Further, at step S813, the control unit 30 sets "incorrect ink tank mounting" for convenience as the results of the ink tank mounting detection processing. Here, "incorrect ink tank mounting" means that the ink tank 22 in the color different from the ink color corresponding to the mounting position of interest is mounted at the mounting position of interest. The relationship between the mounting position and the ink color corresponding to the mounting position will be described later by using FIG. 9. After step S813, the control unit 30 terminates this processing.

In the case where the checksum coincides with the written value at step S807, that is, in the case where the checksum of the value read at step S805 is normal (YES at step S808), the processing advances to step S809. At step S809, the control unit 30 checks ink color information written at address 0x08 of the values read at step S805 and checks whether the ink color described in the ink color information is appropriate. That the ink color described in ink color information is appropriate refers to that the ink color coincides with the ink color corresponding to the mounting position of interest.

In the case where the ink color described in the ink color information is not appropriate (NO at step S810), the control unit 30 sets "incorrect ink tank mounting" as the results of the ink tank mounting detection processing (step S814). The reason is that the ink color described in the ink color information does not coincide with the ink color corresponding to the mounting position of interest is considered that the ink tank 22 in the ink color different from that of the ink tank 22 that should be mounted at the mounting position of interest is mounted at the mounting position of interest. In order to resolve such a state, it is necessary to remove the ink tank 22. In the case where the ink tank 22 is removed, the information acquisition necessity flag is set to "necessary (ON)" at step S812, and therefore, at step S814, the information acquisition necessity flag is set to "not necessary (OFF)". After step S814, the control unit 30 terminates this processing.

In the case where the ink color described in the ink color information is appropriate (YES at step S810), the control unit 30 sets "normal ink tank mounting" as the results of the ink tank mounting detection processing (step S811). Here, "normal ink tank mounting" means that the ink tank 22 in the ink color corresponding to the mounting position of interest is mounted at the mounting position of interest. Further, the control unit 30 sets the information acquisition necessity flag to "not necessary (OFF)". Due to this, in the ink tank mounting detection processing of the next time and subsequent times for the current tank of interest, the processing at step S805 and subsequent steps is omitted. After step S811, the control unit 30 terminates this processing.

FIG. 9 is a diagram showing an example of control information used in the ink tank mounting detection processing shown in FIG. 8A and FIG. 8B. In the case where the I2C bus SW 42 is switched at step S801 in FIG. 8A and FIG. 8B, the I2C bus switch number (middle column in FIG. 9) corresponding to the ink color (left column in FIG. 9) of the tank of interest is written from the I2C master 41 to the I2C bus SW 42 under the control of the control unit 30. The I2C bus switch numbers 1 to 4 are allocated in order from the top to the four ports on the downstream side of the I2C bus SW 42 shown in FIG. 4 in the present embodiment. That is, in the present embodiment, it is supposed that the ink tanks of cyan (C), magenta (M), yellow (Y), and black (K) are connected to the four connection reception ports 44 shown in FIG. 4 in order from the top. "Memory color information" of the right column in FIG. 9 is a value that is compared with the value written at address 0x08 of the nonvolatile memory 46 of the tank of interest at step S809 in FIG. 8A and FIG. 8B. In the example shown in FIG. 9, in the case where 0x11111111, 0x22222222, 0x33333333, and 0x44444444 are read in order from the top for the four nonvolatile memories 46 shown in FIG. 4, it is determined that the ink tank in each color is mounted appropriately.

Figure 10A:
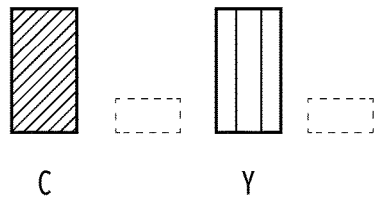
FIG. 10A and FIG. 10B are diagrams each showing an example of a screen displayed at the time of completion of the processing shown in FIG. 5.
Figure 10B:
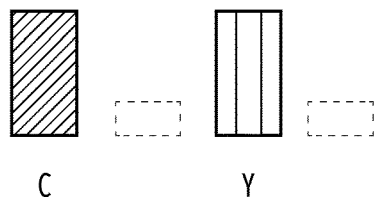

FIG. 10A and FIG. 10B are diagrams each showing an example of a screen displayed on the display panel 14 at the time of completion of the processing (ink tank exchange processing) shown in FIG. 5. On the screens shown in FIG. 10A and FIG. 10B, the results of the ink tank mounting detection processing performed immediately before the exchange cover 15 is closed, that is, performed last in the state where the exchange cover 15 is open (open state) are displayed. In FIG. 10A, an example of the screen showing that "ink tank not mounted" is determined is shown. The screen shown in FIG. 10A shows that the cyan (C) and yellow (Y) ink tanks 22 are not mounted. In FIG. 10B, an example of the screen showing that "incorrect ink tank mounting" is determined for cyan (C) and yellow (Y) is shown. The screen shown in FIG. 10B gives a notification that the ink tanks 22 in different colors are mounted at the mounting positions of cyan (C) and yellow (Y). It is possible for a user to open the exchange cover 15 again and to correctly mount the ink tank again by viewing the screen displayed on the display panel 14.

As described above, in the present embodiment, whether or not reading of information is performed from the nonvolatile memory 46 is switched based on the information acquisition necessity flag that is set in accordance with the mounting state of the ink tank at the mounting position of interest. In particular, for the mounting position for which the information acquisition necessity flag is set to "not necessary (OFF)", reading of information from the nonvolatile memory 46 of the ink tank 22 is omitted, and therefore, it is possible to reduce the time required for the ink tank mounting detection processing (processing at S503). Due to this, it is made possible to immediately reflect the change in the mounting state of one of the ink tanks 22, which is detected at step S503, on the screen of the display panel 14 shown in FIG. 6A and FIG. 6B. For example, in the case where immediately after the processing at step S503 is performed for one mounting position, the ink tank at the one mounting position is mounted and unmounted, the mounting and unmounting are not detected until the processing at step S503 is performed again for the one mounting position. However, in the present embodiment, for the mounting position at which the ink tank is mounted normally, the check of color information is omitted in the processing at step S503 (corresponding to the processing for which No is determined at step S804).

Consequently, the execution interval of the processing at step 503, which is performed for the one mounting position, is reduced. Due to this, as described above, even in the case where immediately after the processing at step S503 is performed for the one mounting position, the ink tank at the one mounting position is mounted and unmounted, it is made possible to detect the mounting and unmounting earlier. Consequently, according to the present embodiment, it is possible to cause a user to immediately recognize that no ink tank is mounted or the ink tank is mounted incorrectly (incorrect mounting). For example, in the case where the processing shown in FIG. 5 is performed in the state where the ink tanks of CMYK are mounted correctly, at step S811, for all the colors, "determination=normal mounting, information acquisition=not necessary" is set. In the case where a user removes the ink tank of C in this state and the mounting state of the ink tanks of MYK is maintained as mounting, for the processing at step S503 for all the ink tanks of MYK, No is determined at S804. Because of this, the processing at steps S805 to S814 is omitted. Then, it is possible for the control unit 30 to quickly return the mounting position of interest to the mounting position of C. As a result of this, it is possible for the control unit 30 to quickly display the screen showing that the ink tank of C is not mounted. CMYK is merely exemplary and an ink tank in another color may be mounted in the printing apparatus 11.

Further, in the present embodiment, in the state where the exchange cover 15 is open, the results of the ink tank mounting detection are displayed on the display panel 14 (steps S502 to S504, FIG. 6A and FIG. 6B). Due to this, it is possible for a user to notice the error of the ink tank exchange operation in the state where the exchange cover 15 is open, and therefore, it is made possible to mount the correct ink tank again in the state where the exchange cover 15 is open. Further, in the case where the exchange cover 15 is closed, the mounting state of the ink tank detected last in the state where the exchange cover 15 is open, and therefore, it is possible for a user to recognize the mounting state of the ink tank even after the exchange cover 15 is closed, Furthermore, in the present embodiment, in the state where the exchange cover 15 is closed, the ink tank mounting detection processing (processing at step S503) and the display processing (processing at step S504) of the ink tank mounting detection results are not performed. Consequently, it is possible reduce the processing load of the control unit 30 in the case where the exchange cover 15 is closed.

In the present embodiment, explanation is given by taking the ink jet printing apparatus 11 as an example. However, the printing scheme of the printing apparatus 11 is not limited to the ink jet scheme and for example, may be the electrophotographic scheme. Further, in the printing apparatus 11 adopting the printing scheme such as this, a toner cartridge may be used as a printing material cartridge. Furthermore, the printing apparatus 11 is taken to be an example, in which the four printing material cartridges (ink tanks) of cyan (C), magenta (M), yellow (Y), and black (k) can be mounted as the printing material colors. However, the combination of the printing material colors is not limited to the above-described combination and the number of printing material colors is not limited to four. Further, for the communication between the control unit 30 and the nonvolatile memory 46 of the printing material cartridge, a communication scheme other than I2C, for example, RS-232C or USB may be used.

OTHER EMBODIMENTS

The embodiment of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of the above-described embodiment and/or that includes one or more circuits (e.g., an application specific integrated circuit (ASIC)) for performing the functions of the above-described embodiment, and by a method performed by the computer of the system or the apparatus by, for example, reading out and executing the computer executable instructions from the storage medium to perform the functions of the above-described embodiment and/or controlling the one or more circuits to perform the functions of one or more of the above-described embodiment. The computer may comprise one or more processors (e.g., a central processing unit (CPU), or a micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

According to the present invention, it is possible to cause a user to immediately recognize that no cartridge is mounted or a cartridge is mounted incorrectly.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155626, filed Aug. 10, 2017, which is hereby incorporated by reference wherein in its entirety.

What is claimed is:

1. A printing apparatus that performs printing on a printing medium by mounting a plurality of printing material cartridges, whose printing material colors are different, at each mounting position determined in advance for each printing material color, the printing apparatus comprising:
   a reading unit configured to read, in a case of detecting a mounting position at which a mounting state of the printing material cartridge has changed from non-mounting to mounting, by performing polling to determine the mounting state of the printing material cartridge at each of the mounting positions, color information indicating a printing material color from the printing material cartridge mounted at the detected mounting position; and
   a notification unit configured to notify, in a case where the printing material color indicated by the color information is different from the printing material color corresponding to the detected mounting position, a user that the printing material cartridge is mounted incorrectly at the detected mounting position, wherein
   the reading unit omits processing to read color information indicating a printing material color from the printing material cartridge mounted at the detected mounting position in a case where the mounting state of the printing material cartridge mounted at the detected mounting position is maintained as mounting.

2. The printing apparatus according to claim 1, wherein the printing material cartridge has a storage medium storing the color information, and
   the reading unit repeatedly performs access to the storage medium of the printing material cartridge for each of the mounting positions, determines that the printing material cartridge is mounted for the mounting position to which the access has succeeded, and determines that the printing material cartridge is not mounted for the mounting position to which the access has failed.

3. The printing apparatus according to claim 1, wherein the reading unit:
holds an information acquisition necessity flag indicating whether or not reading of the color information from the printing material cartridge is necessary for each of the mounting positions;
sets the information acquisition necessity flag corresponding to a mounting position at which the printing material cartridge is not mounted to ON; and
reads the color information from the printing material cartridge in a case where the information acquisition necessity flag is set to ON for a mounting position at which a mounting state of the printing material cartridge has changed from non-mounting to mounting.

4. The printing apparatus according to claim 3, wherein the reading unit sets the information acquisition necessity flag corresponding to the detected mounting position to OFF in a case where reading of the color information from the printing material cartridge mounted at the detected mounting position has succeeded.

5. The printing apparatus according to claim 3, wherein the reading unit leaves the information acquisition necessity flag corresponding to the detected mounting position ON in a case where reading of the color information from the printing material cartridge mounted at the detected mounting position has failed.

6. The printing apparatus according to claim 3, wherein the reading unit leaves the information acquisition necessity flag corresponding to the detected mounting position ON in a case where there is an error in data of the read color information even though reading of the color information from the printing material cartridge mounted at the detected mounting position has succeeded.

7. The printing apparatus according to claim 1, further comprising:
an opening for exchanging the plurality of printing material cartridges mounted inside a casing; and
a cover that opens and closes the opening, wherein,
in a case where the cover is in a closed state, processing by the reading unit is not performed.

8. The printing apparatus according to claim 7, wherein the notification unit notifies, in a case where the cover is closed and on a condition that the printing material color indicated by the color information, which is read last in a state where the cover is open from the printing material cartridge mounted at the detected mounting position, is different from the printing material color corresponding to the detected mounting position, a user that the printing material cartridge is mounted incorrectly at the detected mounting position.

9. A control method of a printing apparatus that performs printing on a printing medium by mounting a plurality of printing material cartridges, whose printing material colors are different, at each mounting position determined in advance for each printing material color, the method comprising:
reading, in a case of detecting a mounting position at which a mounting state of the printing material cartridge has changed from non-mounting to mounting, by performing polling to determine the mounting state of the printing material cartridge at each of the mounting positions, color information indicating a printing material color from the printing material cartridge mounted at the detected mounting position; and
notifying, in a case where the printing material color indicated by the color information is different from the printing material color corresponding to the detected mounting position, a user that the printing material cartridge is mounted incorrectly at the detected mounting position, wherein
processing to read color information indicating a printing material color from the printing material cartridge mounted at the detected mounting position is omitted in a case where the mounting state of the printing material cartridge mounted at the detected mounting position is maintained as mounting.

10. The control method according to claim 9, wherein the printing material cartridge has a storage medium storing the color information,
access to the storage medium of the printing material cartridge is performed repeatedly for each of the mounting positions, it is determined that the printing material cartridge is mounted at the mounting position to which the access has succeeded, and it is determined that the printing material cartridge is not mounted at the mounting position to which the access has failed.

11. The control method according to claim 9, wherein
an information acquisition necessity flag indicating whether or not reading of the color information from the printing material cartridge is necessary is held for each of the mounting positions,
the information acquisition necessity flag corresponding to a mounting position at which the printing material cartridge is not mounted is set to ON, and
the color information is read from the printing material cartridge in a case where the information acquisition necessity flag is set to ON for a mounting position at which a mounting state of the printing material cartridge has changed from non-mounting to mounting.

12. The control method according to claim 11, wherein the information acquisition necessity flag corresponding to the detected mounting position is set to OFF in a case where reading of the color information from the printing material cartridge mounted at the detected mounting position has succeeded.

13. The control method according to claim 11, wherein the information acquisition necessity flag corresponding to the detected mounting position is maintained as ON in a case where reading of the color information from the printing material cartridge mounted at the detected mounting position has failed.

14. The control method according to claim 11, wherein the information acquisition necessity flag corresponding to the detected mounting position is maintained as ON in a case where there is an error in data of the read color information even though reading of the color information from the printing material cartridge mounted at the detected mounting position has succeeded.

15. The control method according to claim 9, wherein the printing apparatus comprises:
an opening for exchanging the plurality of printing material cartridges mounted inside a casing; and
a cover that opens and closes the opening, wherein,
in a case where the cover is in a closed state, color information indicating a printing material color is not read from the printing material cartridge mounted at the detected mounting position.

16. The control method according to claim 15, wherein, in a case where the cover is closed and on a condition that the printing material color indicated by the color information, which is read last in a state where the cover is open from the printing material cartridge mounted at the detected mounting position, is different from the printing material color corresponding to the detected mounting position, a user is notified that the printing material cartridge is mounted incorrectly at the detected mounting position.

17. A non-transitory computer readable storage medium storing a program for causing a computer to perform a control method of a printing apparatus that performs printing on a printing medium by mounting a plurality of printing material cartridges, whose printing material colors are different, at each mounting position determined in advance for each printing material color, the method comprising:

reading, in a case of detecting a mounting position at which a mounting state of the printing material cartridge has changed from non-mounting to mounting, by performing polling to determine the mounting state of the printing material cartridge at each of the mounting positions, color information indicating a printing material color from the printing material cartridge mounted at the detected mounting position; and notifying, in a case where the printing material color indicated by the color information is different from the printing material color corresponding to the detected mounting position, a user that the printing material cartridge is mounted incorrectly at the detected mounting position, wherein the reading of color information indicating a printing material color from the printing material cartridge mounted at the detected mounting position is omitted in a case where the mounting state of the printing material cartridge mounted at the detected mounting position is maintained as mounting.

* * * * *